United States Patent
Sugiyama et al.

(10) Patent No.: US 6,950,218 B2
(45) Date of Patent: Sep. 27, 2005

(54) OPTICAL MODULATOR

(75) Inventors: Masaki Sugiyama, Kawasaki (JP);
Tadao Nakazawa, Zama (JP);
Masaharu Doi, Kawasaki (JP);
Takehito Tanaka, Kawasaki (JP);
Akira Ishii, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 29 days.

(21) Appl. No.: 10/855,582

(22) Filed: May 28, 2004

(65) Prior Publication Data

US 2005/0134952 A1    Jun. 23, 2005

(30) Foreign Application Priority Data

Dec. 17, 2003  (JP) .............................. 2003-419762

(51) Int. Cl.[7] .......................... G02F 1/03; G02F 1/035; G02F 1/245
(52) U.S. Cl. ...................... 359/245; 359/248; 359/254; 385/2; 385/4
(58) Field of Search ............................. 359/245, 248, 359/254, 240, 238; 385/2, 3, 4, 8

(56) References Cited

FOREIGN PATENT DOCUMENTS

| JP | 5-509415 | 12/1993 |
|----|----------|---------|
| JP | 7-64030 | 3/1995 |
| JP | 10-239648 | 9/1998 |
| JP | 2003-075790 | 3/2003 |
| WO | WO 91/17470 | 11/1991 |

Primary Examiner—Timothy Thompson
(74) Attorney, Agent, or Firm—Staas & Halsey LLP

(57) ABSTRACT

The present invention has an object to provide a Mach-Zehnder optical modulator with the excellent productivity and reliability, which can obtain a favorable optical response characteristic even if a high frequency electric signal is applied to a signal electrode. To this end, the present optical modulator is configured such that, in a Mach-Zehnder optical modulator in which an optical waveguide and a coplanar electrode are formed on a surface of a substrate having an electro-optic effect, floating electrodes formed using a conducting material, are provided on side faces along parallel waveguides, among side faces substantially perpendicular to the surface of the substrate. Thus, even when a high frequency electric signal is applied to the signal electrode, a phenomenon is suppressed in which a particular frequency resonates within the substrate, and an occurrence of dip in a particular frequency is avoided.

11 Claims, 9 Drawing Sheets

A-A CROSS SECTION

A-A CROSS SECTION

A-A CROSS SECTION

US 6,950,218 B2

OPTICAL MODULATOR

BACKGROUND OF THE INVENTION

1. Field of the Invention

The present invention relates to an optical waveguide device used for an optical communication, and in particular, to a Mach-Zehnder optical modulator.

2. Description of the Related Art

An optical waveguide device using electro-optic crystal, for example, lithium niobate (LiNbO$_3$), lithium tantalate (LiTaO$_2$) or the like, is formed such that a metallic film is formed on a part of a crystal substrate to be thermally diffused, or proton exchanged in benzoic acid after patterning, to form an optical waveguide, and then an electrode is disposed in the vicinity of the optical waveguide. As one of such optical waveguide devices using electro-optic crystal, there has been known a Mach-Zehnder optical modulator with branching interference type optical waveguide structure.

FIG. 8 is a perspective view showing an example of a conventional Mach-Zehnder optical modulator configured using a lithium niobate substrate of Z-cut. In this conventional Mach-Zehnder optical modulator, a titanium (Ti) film is formed on a substrate 101. The substrate 101 formed with the titanium film is patterned into a shape of Mach-Zehnder type, and thereafter, heated for 7 to 10 hours at 1050° C., and thermally diffused. As a result, an optical waveguide 110 is formed. The optical waveguide 110 comprises an incident waveguide 111, a branching section 112, parallel waveguides 113A and 113B, a multiplexing section 114 and an emission waveguide 115, and a coplanar electrode 120 comprising a signal electrode 121 and an earthed electrode 122 is disposed along the parallel waveguides 113A and 113B. In the case where the substrate 101 of Z-cut is used, the signal electrode 121 is arranged over the optical waveguide 113A in order to utilize a change in refractive index due to an electric field in a Z-direction. Further, the signal electrode 121 and the earthed electrode 122 are formed on the substrate 101 via a buffer layer (not shown in the figure) consisting of SiO$_2$ having the thickness of 0.2 to 1 μm, so as to prevent the absorption of lights propagated through the parallel waveguides 113A and 113B.

In the case where such a conventional Mach-Zehnder optical modulator is driven at a high speed, one end of the signal electrode 121 is earthed via a resistor (not shown in the figure) to be made a traveling-wave electrode, and a high frequency electric signal S, such as a microwave, is applied with through the other end of the signal electrode 121. At this time, since the refractive index of each of the parallel waveguides 113A and 113B is changed due to an electric field E generated between the signal electrode 121 and the earthed electrode 122, a phase difference between lights being propagated through the parallel waveguides 113A 113B is changed, so that a signal light L' whose intensity is modulated, is output from the emission waveguide 115.

For the Mach-Zehnder optical modulator as described above, It has been known that a cross sectional shape of the signal electrode 121 is changed to control an effective refractive index of the microwave, and propagation speeds of the light and the microwave are matched with each other, to thereby obtain a wide band optical response characteristic. Further, there has been proposed a technique in which an earthed electrode is disposed on a rear face (opposite to the surface on which the optical waveguide 110 and the electrode 120 are formed) of the substrate 101, on a side face, along the parallel waveguides 113A and 113B, of the substrate 101, or the like, to achieve the stabilization of a propagation characteristic of the electric signal S to be applied to the signal electrode 121 (refer to Japanese Unexamined Patent Publication No. 10-239648, Japanese Unexamined Patent Publication No. 2003-75790, Japanese National Publication No. 5-509415 and Japanese Unexamined Patent Publication No. 7-64030).

In the conventional Mach-Zehnder optical modulator as shown in FIG. 8, there is a problem in that the optical response characteristic is deteriorated in the case where the electric signal S at a high speed of for example 40 Gb/s or the like is applied to the signal electrode 121. Namely, if the electric signal at 40 Gb/s or the like is applied to the signal electrode 121, a dip occurs in a frequency characteristic (S21) of the electric signal S being propagated through the signal electrode 21 as shown in FIG. 9, caused by the resonance of a certain frequency component within the substrate 101. Due to the occurrence of such a dip, a loss of an optical signal being propagated through the optical waveguide 110 relative to a data signal having a particular pattern corresponding to that frequency becomes large, resulting in the deterioration of the optical response characteristic.

Further, in the case where the propagation characteristic of the high frequency electric signal S is improved by disposing the earthed electrode on the rear face or the side face of the substrate 101, there is a problem in manufacturing as follows. Namely, in the case where the earthed electrode is disposed on the rear face of the substrate 101, it is difficult to perform a visual inspection from a rear face side. To be specific, in many cases, the displacement of the optical waveguide 110 and the coplanar electrode 120 formed on the surface of the substrate 101 is usually verified by the visual inspection from the rear face side of the substrate 101. However, if the earthed electrode is formed on the entirety or a part of the rear face of the substrate 101, a state of the surface side is invisible and therefore, it becomes difficult to perform the visual inspection as described above.

Moreover, in order to reliably earth the electrode formed on the rear face or the side face of the substrate 101, it is necessary to form, for example, a metallic film continuously from the earthed electrode 122 on the surface through the side face to the rear face. However, since the formed metallic film is likely to separate from the face in the vicinity of corners of the substrate 101, there is a disadvantage in that the yield rate and the reliability of the substrate 101 shall be reduced. Although there is a configuration in which the electrode on the rear face or the side face of the substrate 101 soldered on an inner face of a housing to which the substrate 101 is implemented, to be earthed, generally, a gap between the substrate 101 to be implemented and the housing is very narrow and it is not readily to perform the soldering or the like. Therefore, there is a problem in that the reproducibility of the earthed state of the substrate 101 after implemented is low.

SUMMARY OF THE INVENTION

The present invention has been accomplished in view of the above problems, and has an object to provide a Mach-Zehnder optical modulator with the excellent productivity and reliability, which can obtain a favorable optical response characteristic even if a high frequency electric signal is applied to a signal electrode.

In order to achieve the above object, an optical modulator of the present invention is a Mach-Zehnder optical modulator in which an optical waveguide having a structure of a Mach-Zehnder interferometer is formed on a surface of a substrate having an electro-optic effect, a signal electrode and an earthed electrode are disposed along a pair of parallel waveguides positioned between a branching section and a multiplexing section of the optical waveguide, and an electric signal is applied to the signal electrode, to modulate a light being propagated through the optical waveguide, comprising a floating electrode formed using a conducting material, on at least one side face along the parallel waveguides, among side faces substantially perpendicular to the surface of the substrate.

In the optical modulator of the above configuration, since the floating electrode is disposed on the side face of the substrate, even when a high frequency electric signal is applied to the signal electrode, a phenomenon is suppressed in which a particular frequency resonates within the substrate, and an occurrence of dip in a particular frequency as in the conventional technique is avoided. Further, any electrode is not formed on a rear face of the substrate. Therefore, it is possible to verify the displacement of the optical waveguide and the electrode formed on the substrate surface by a visual inspection from the rear face side. Thus, even if the high frequency electric signal is applied to the signal electrode, it is possible to obtain a favorable optical response characteristic and also to improve the productivity and reliability.

Further, it is preferable that the floating electrode described above is formed on an intermediate portion except for ranges of respective predetermined distances from the surface and rear face of the substrate, on the side face of the substrate. Thus, the floating electrode is hardly to separate from the side face.

Moreover, it is preferable that the floating electrode is formed on a remaining portion except for a range of a predetermined distance from the center of pad portions of the signal electrode to which the electric signal is applied, on the side face of the substrate in the vicinity of the pad portions. With such a configuration, the reflection of the electric signal applied to the pad portions of the signal electrode is suppressed.

In addition, the above floating electrode may be formed using at least one of titanium and gold. By forming the floating electrode using such material, the adhesiveness of the floating electrode to the side face of the substrate is improved.

The optical modulator described above may be provided with a silicon film formed on the side face of the substrate. Thus, a temperature characteristic of the optical modulator is stabilized.

The other objects, features and advantages of the present invention will be apparent from the following description of the embodiments with reference to the accompanying drawings.

DETAILED DESCRIPTION OF THE INVENTION

Figure 1:
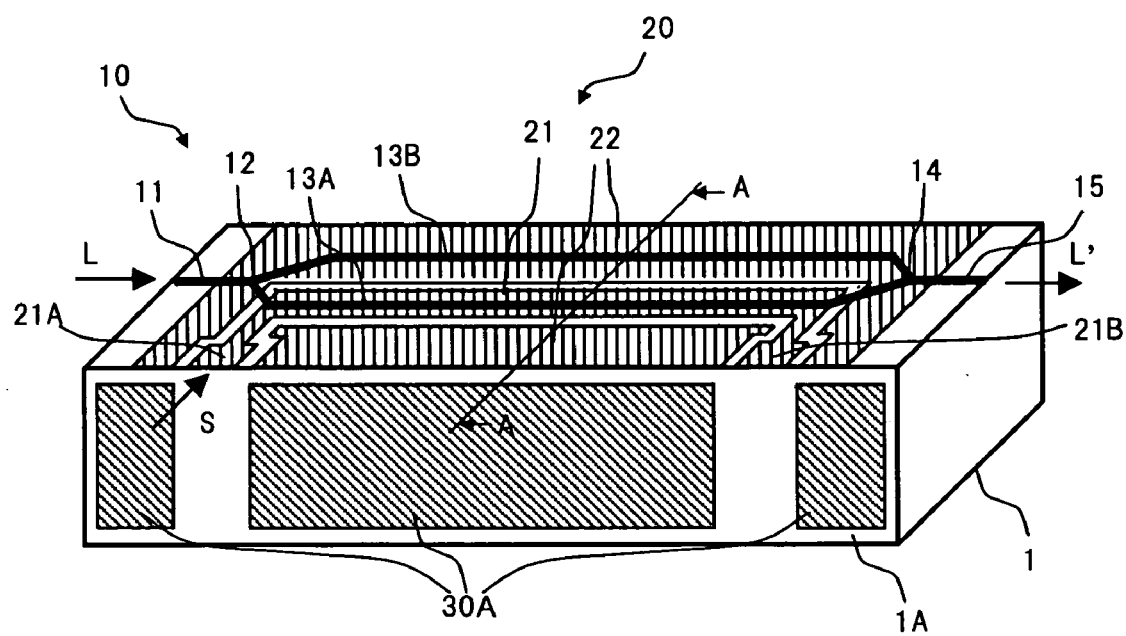
FIG. 1 is a perspective view showing a configuration of a Mach-Zehnder optical modulator according to one embodiment of the present invention.

Hereinafter, embodiments of the present invention will be described with reference to drawings. Identical reference numerals denote identical or equivalent parts throughout all of the figures.

FIG. 1 is a perspective view showing a configuration of a Mach-Zehnder optical modulator according to one embodiment of the present invention. Further, FIG. 2 is a diagram showing A—A cross section of FIG. 1.

Figure 2:
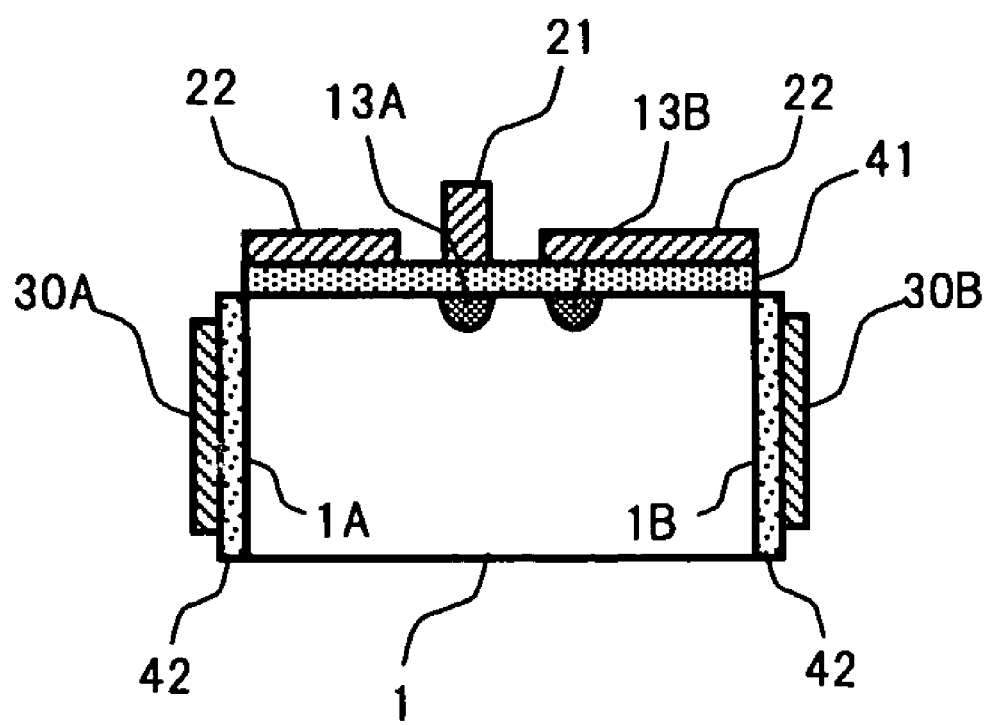
FIG. 2 is a diagram showing A—A cross section of FIG. 1.

In FIG. 1 and FIG. 2, the present optical modulator comprises: a substrate 1 having an electro-optic effect; a branching interference type optical waveguide 10 formed on the surface of the substrate 1; a coplanar (CPW) electrode 20 formed on the surface of the substrate 1 via a buffer layer 41; and floating electrodes 30A and 30B respectively formed on side faces 1A and 1B via a silicon (Si) film 42.

For the substrate 1, for example, a lithium niobate ($LiNbO_3$; LN) substrate of Z-cut or the like is used. Here, the description is made on the case where the substrate of Z-cut is used. However, the present invention is not limited thereto, and a substrate of X-cut may be used. Further, the substrate material is not limited to lithium niobate, and for example, it is possible to utilize a known material having an electro-optic effect, such as lithium tantalate ($LiTaO_2$).

Figure 8:
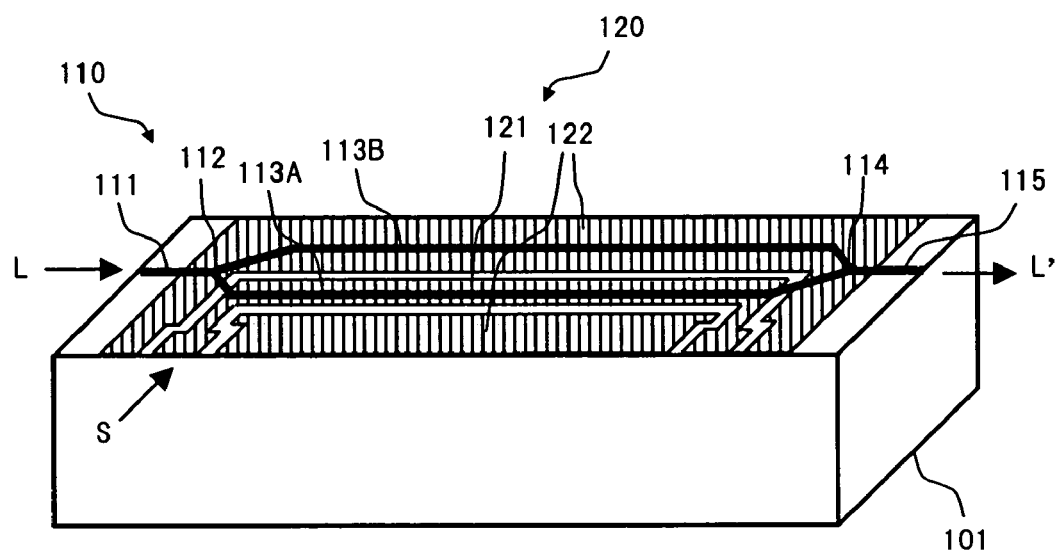
FIG. 8 is a perspective view showing a configuration example of a conventional Mach-Zehnder optical modulator.
Figure 9:
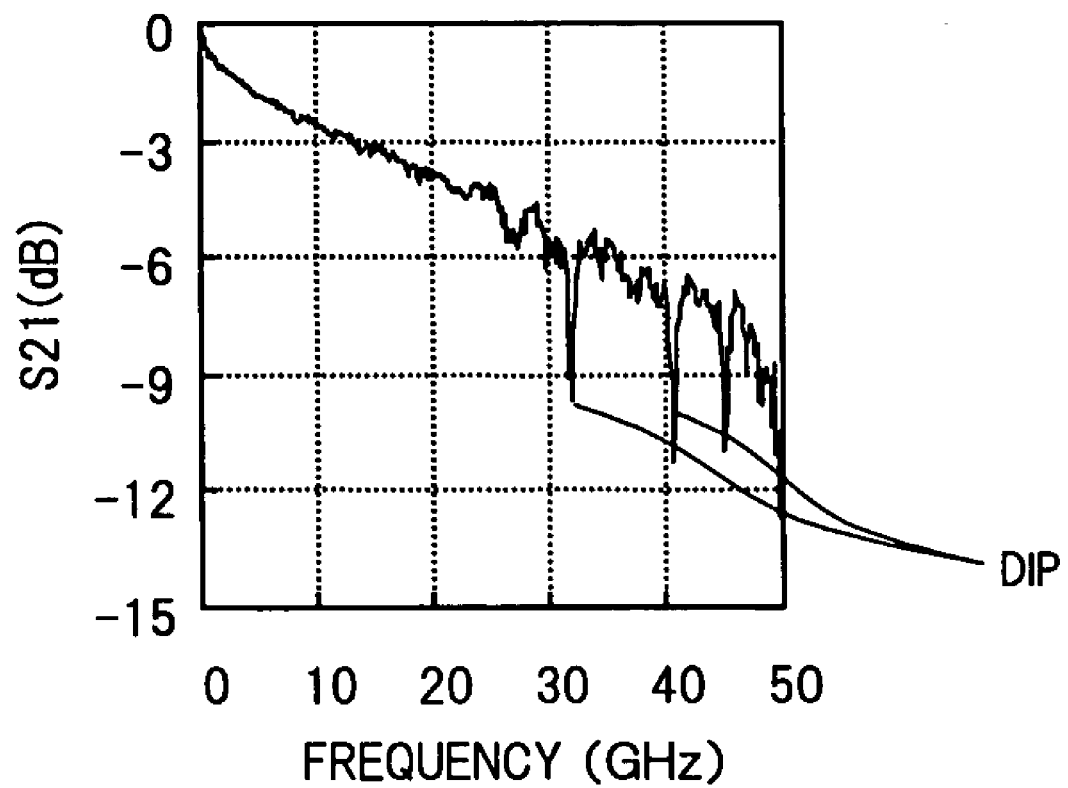
FIG. 9 is a diagram showing one example of a frequency characteristic of an electric signal propagated through a signal electrode in the conventional Mach-Zehnder optical modulator.

Similarly to the conventional configuration shown in FIG. 8, the optical waveguide 10 includes an incident waveguide 11, a branching section 12, parallel waveguides 13A and 13B, a multiplexing section 14 and an emission waveguide 15, to construct a Mach-Zehnder interferometer. This optical waveguide 10 is formed on a −Z plane of the substrate 1 by the known processing, such as titanium (Ti) diffusion or proton exchange. An optical incidence end (one end positioned on the left side in FIG. 1) of the incident waveguide 11 and an optical emission end (one end positioned on the right side in FIG. 1) of the emission waveguide 15 respectively reach opposing side faces of the substrate 1. Here, as shown in FIG. 2, the optical waveguide 10 has a semicircular shape. However, the cross sectional shape of the optical waveguide in the present invention is not limited to the above example.

The coplanar electrode 20, similarly to that in the conventional configuration shown in FIG. 8 described above, includes a signal electrode 21 and an earthed electrode 22. To be specific, the signal electrode 21 is patterned, so that the signal electrode 21 passes over the one parallel waveguide 13A, and both ends thereof are connected with pad portions 21A and 21B formed in the vicinity of a side face 1A (near side in the figure) of the substrate 1. On the other hand, the earthed electrode 22 is patterned so as to pass over the other parallel waveguide 13B of the substrate 1 at a fixed distance from the signal electrode 21. In the signal electrode 21, the pad portion 21B positioned on the right side in FIG. 1 is earthed via a resistor (not shown in the figure) to be made a traveling-wave electrode, and a high frequency electric signal S corresponding to modulation data is applied with through the pad portion 21A positioned on the left side in FIG. 1. An interval between the signal electrode 21 and the earthed electrode 22, and each electrode thickness thereof are previously designed, so that an optical response 3 dB band reaches a predetermined frequency or above (for example, 30 GHz or more in the case of optical modulation at 40 Gb/s).

Note, the buffer layer 41 formed between the coplanar electrode 20 and the surface of the substrate 1 is the one for preventing the light propagated through the optical waveguide 10 from being absorbed by the coplanar electrode 20. To be specific $SiO_2$ of 0.2 to 1 µm thickness can be used as the buffer layer 41.

The floating electrodes 30A and 30B are formed by coating films having the conductivity on the side faces 1A and 1B along the parallel waveguides 13A and 13B, respectively, among side faces substantially perpendicular to the surface of the substrate 1. Specifically, it is preferable that the floating electrodes 30A and 30B are formed by coating, on the respective side faces 1A and 1B of the substrate 1, metal films each consisting of, for example, titanium (Ti) or gold (Au) with excellent adhesiveness to the substrate 1. However, the material used for the floating electrodes of the present invention is not limited to the above specific example, and it is possible to use an arbitrary material having the conductivity. Further, it is preferable that ranges of about 100 µm from the surface and rear face in each of the side faces of the substrate 1 is not coated, and each of the floating electrode 30A and 30B is formed on the remaining intermediate portion, so as to prevent the separation of the film from the substrate 1. Moreover, in the side face 1A, which is in the vicinity of the pad portions 21A and 21B of the signal electrode 21, it is desirable that the floating electrode 30A is not formed in a range of about 0.5 mm from the center of the pad portions 21A and 21B, so as to suppress the reflection of the electric signal S to be applied to the signal electrode 21 at an input section. Contrary to this, in the side face 1B opposite to the side face 1A, since the reflection of the high frequency electric signal S is not influenced, the floating electrode 30B may be formed over an entire range except for the portions near corners of the substrate 1.

Figure 3:
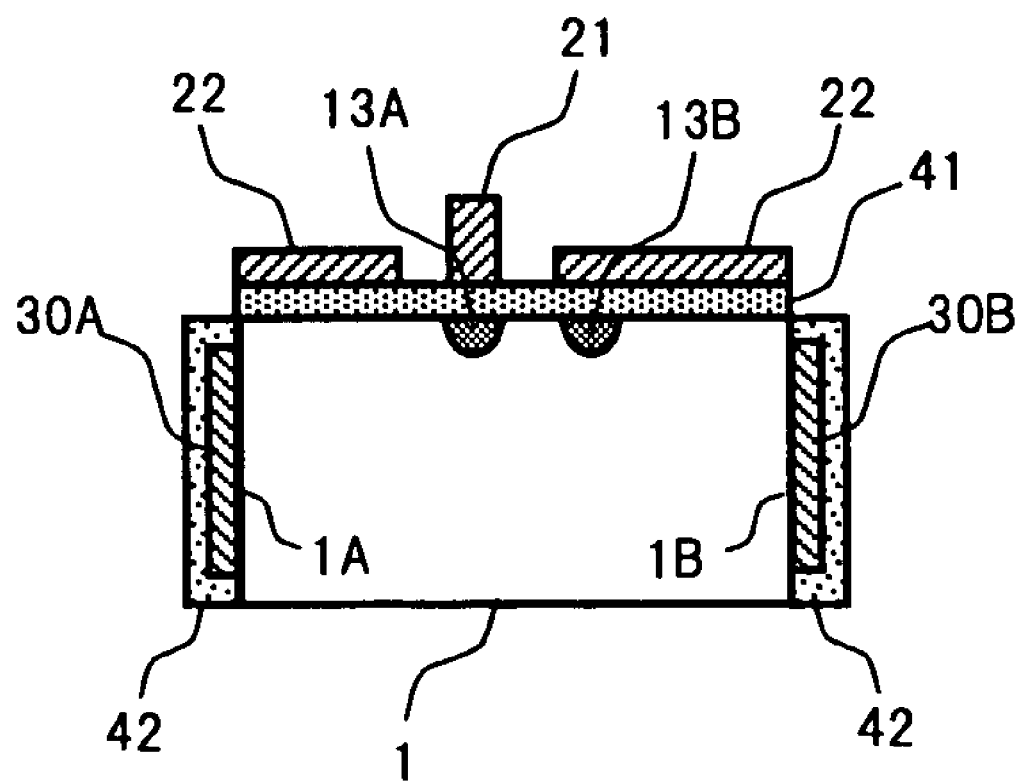
FIG. 3 is a cross section showing another configuration example in the above embodiment, in which a Si film is formed on a floating electrode in the above embodiment.

Note, Si films 42 formed between the floating electrode 30A and the side face 1A of the substrate 1, and between the floating electrode 30B and the side face 1B of the substrate 1, are for stabilizing a temperature characteristic of the optical modulator. Here, the Si films are formed between the substrate, and the floating electrodes 30A and 30B, respectively. However, for example as shown in FIG. 3, it is possible to form the Si films 42 on the floating electrodes 30A and 30B. The order of coating of the floating electrode and the Si film may be appropriately determined so as to achieve the favorable adhesiveness of the floating electrode to the substrate 1.

In the optical modulator of the above configuration, a continuous light L given to the incident waveguide 11 from the outside is branched into two by the branching section 12 to be sent to the respective parallel waveguides 13A and 13B. The parallel waveguides 13A and 13B are applied with an electric field E generated between the signal electrode 21 and the earthed electrode 22 according to the electric signal S at for example 40 Gb/s, which is given to the pad portion 21A to travel the signal electrode 21, and due to an electro-optic effect by the electric field E, refractive indexes of the parallel waveguides 13A and 13B are changed. As a result, phases of the lights being propagated through the respective parallel waveguides 13A and 13B are changed, respectively. Then, the lights propagated through the parallel waveguides 13A and 13B are multiplexed by the multiplexing section 14, so that an optical signal L' modulated at a bit rate of 40 Gb/s or the like passes through the emission waveguide 15 to be emitted to the outside.

Figure 4:
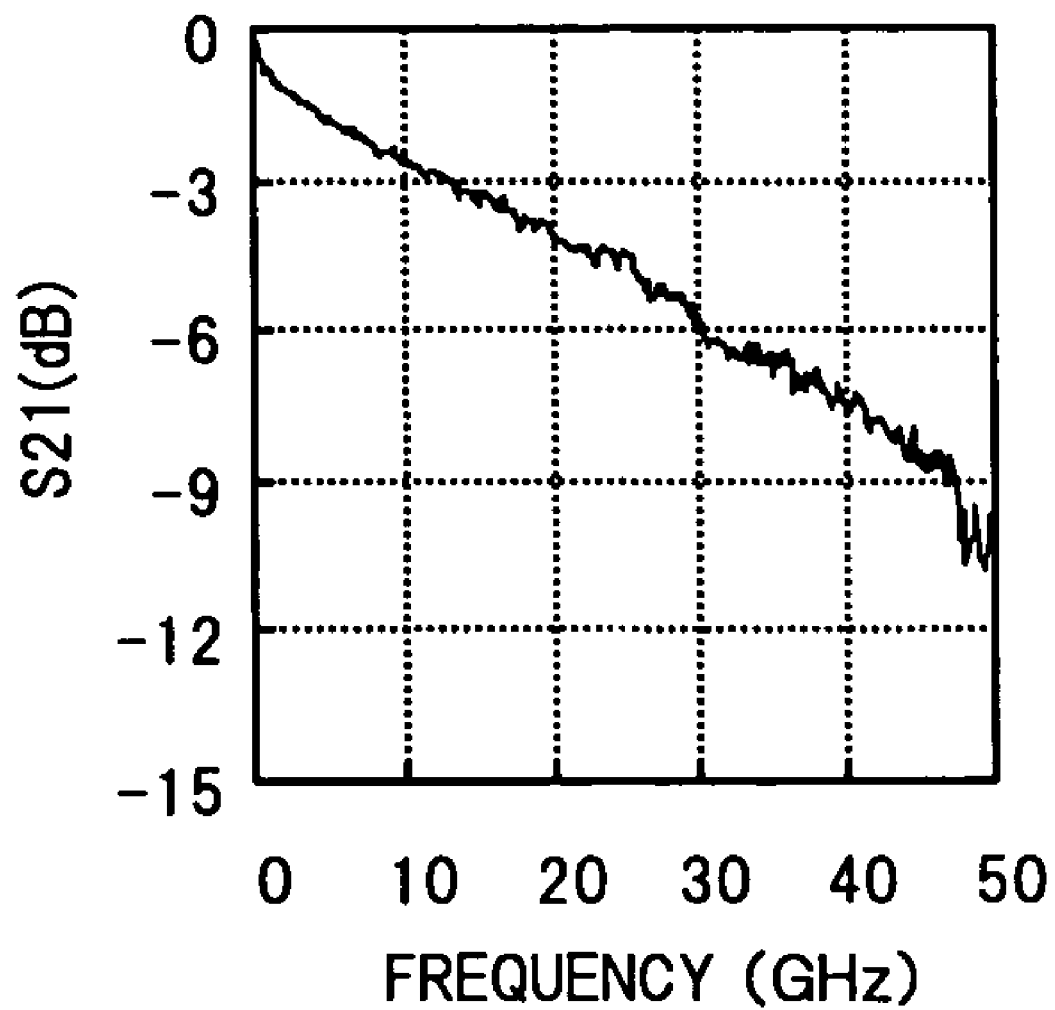
FIG. 4 is a diagram showing a frequency characteristic of an electric signal propagated through a signal electrode.

In the optical modulation operation as described above, for a frequency characteristic of the electric signal S being propagated through the signal electrode 21, a resonance phenomenon of a particular frequency component within the substrate 1 is suppressed by disposing the floating electrodes 30A and 30B on the side faces 1A and 1B of the substrate 1. For example, as shown in FIG. 4, an occurrence of dip in a particular frequency as in the conventional technique is avoided. As a result, it becomes possible to obtain a favorable optical response characteristic to a high bit rate of 40 Gb/s or the like.

Further, in the present optical modulator, since any electrode is not formed on the rear face of the substrate 1, it becomes possible to readily verify the displacement of the optical waveguide 10 and the coplanar electrode 20 by a visual inspection from the rear face side. Moreover, differently from the conventional earthed electrode, since the floating electrodes 30A and 30B formed on the side faces 1A and 1B of the substrate 1 do not need to be formed continuously from the earthed electrode 22 on the surface of the substrate 1, the coating can be given on the entire range except for the portions near the corners of the substrate 1 from which the electrode is likely to separate. Thus, it becomes also possible to improve the yield rate and the reliability of the substrate 1. In addition, in implementing the substrate 1 to a housing (not shown in the figure), differently from the conventional technique, there is no need to solder the electrode of the substrate side face on an inner face of the housing. Therefore, it is possible to implement the substrate 1 to the housing with high reproducibility.

Figure 5:
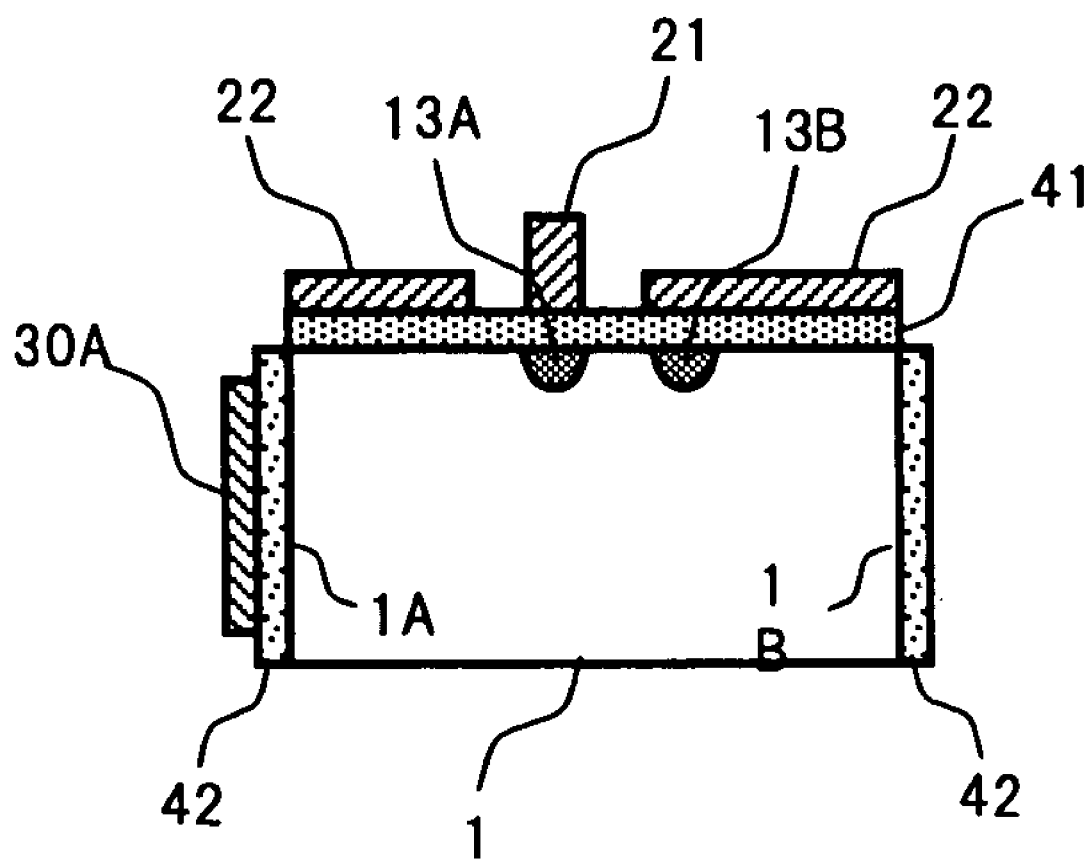
FIG. 5 is a cross section showing a further configuration example related to the above embodiment, in which the floating electrode is disposed on one of side faces of a substrate.

Note, in the above embodiment, the floating electrodes are formed on both of the side faces 1A and 1B along the parallel waveguides 13A and 13B, respectively. However, for example as shown in a cross section of FIG. 5, it is possible to obtain an effect of suppressing the occurrence of dip by disposing the floating electrode only on the side face 1A (or the side face 1B). Further, in the above embodiment, there has been shown a so-called single drive configuration in which the signal electrode 21 is disposed along the one waveguide 13A of the parallel waveguides 13A and 13B. However, since the effect of the present invention does not depend on a position of the signal electrode in the surface of the substrate 1, it is possible to apply the present invention to a so-called dual drive configuration in which the signal electrodes are respectively disposed along the respective parallel waveguides 13A and 13B.

Figure 6:
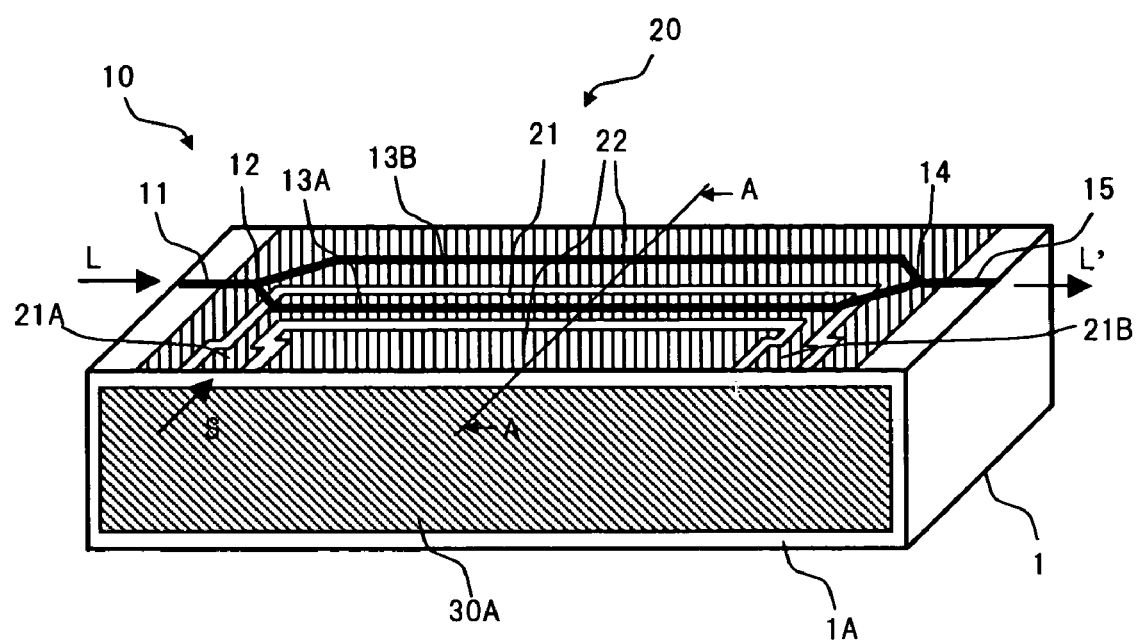
FIG. 6 is a perspective view showing a still another configuration example related to the above embodiment, in which the floating electrode is formed on an entire range except for a portion near edges of a side face in the vicinity of pad portions of the signal electrode.

Moreover, the floating electrode 30A is not formed in a predetermined range from the center of the pad portions 21A and 21A on the side face 1A in the vicinity of the pad portions 21A and 21B of the signal electrode 21. However, there is the case where the floating electrode is not formed in the vicinity of the corners of the substrate 1 (for example, a range of near 100 μm from the surface), so that the reflection of the electric signal S by the floating electrode is not particularly a problem. In such a case, for example as shown in FIG. 6, the floating electrode 30A may be formed over the entire range of the side face 1A of the substrate 1 except for the portions near the corners of the substrate 1.

Figure 7:
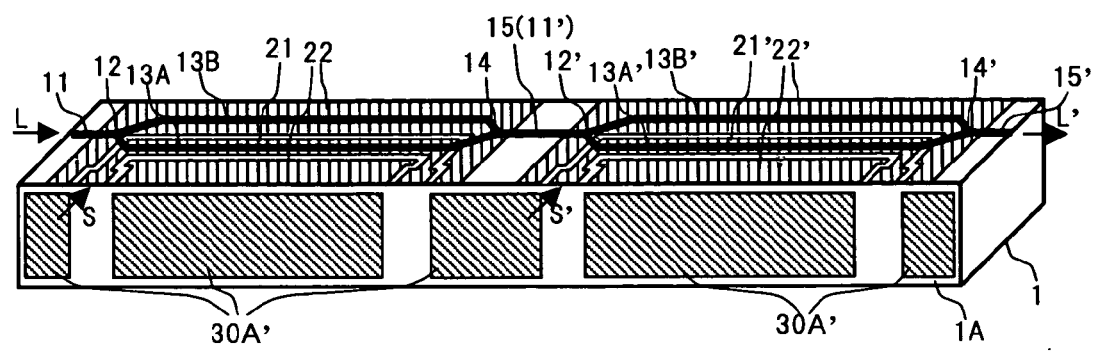
FIG. 7 is a perspective view showing a configuration example in the case where the present invention is applied to a Mach-Zehnder optical modulator of two-stage configuration.

In addition, in the above embodiment, the description has been made on the Mach-Zehnder optical modulator with a single stage configuration. However, as shown in FIG. 7, the present invention can be applied to a Mach-Zehnder optical modulator with a two or more stage configuration. To be specific, in the example of FIG. 7, the configuration shown in FIG. 1 is connected in series in two stages on the same substrate 1, to construct one optical modulator. In this Mach-Zehnder optical modulator with the two stage configuration, for example, a clock signal is used as the electric signal S to be applied to the signal electrode 21 on the former stage, and a data signal is used as an electric signal S' to be applied to a signal electrode 21' on the latter stage, so that the optical signal L' modulated in accordance with an RZ format and the like is generated. Also in the Mach-Zehnder optical modulator with the two stage configuration as described above, it is possible to obtain an effect similar to that in the single stage configuration, by disposing the floating electrode on at least one of the side faces along the optical waveguide of the substrate 1.

What is claimed is:

1. An optical modulator of Mach-Zehnder type in which an optical waveguide having a structure of a Mach-Zehnder interferometer is formed on a surface of a substrate having an electro-optic effect, a signal electrode and an earthed electrode are disposed along a pair of parallel waveguides positioned between a branching section and a multiplexing section of said optical waveguide, and an electric signal is applied to said signal electrode, to modulate a light being propagated through said optical waveguide, comprising;

a floating electrode formed using a conducting material, on at least one side face along said parallel waveguides, among side faces substantially perpendicular to the surface of said substrate.

2. An optical modulator according to claim 1, wherein said floating electrode is formed on an intermediate portion, except for ranges of respective predetermined distances from the surface and rear face of said substrate, on the side face of said substrate.

3. An optical modulator according to claim 1, wherein said floating electrode is formed on a remaining portion, except for a range of a predetermined distance from the center of pad portions of said signal electrode to which the electric signal is applied, on the side face of said substrate in the vicinity of said pad portions.

4. An optical modulator according to claim 1, wherein said floating electrode is formed using at least one of titanium and gold.

5. An optical modulator according to claim 1, wherein said substrate is a lithium niobate substrate.

6. An optical modulator according to claim 1, wherein said signal electrode is disposed along one of said pair of parallel waveguides.

7. An optical modulator according to claim 1, wherein said signal electrode is disposed along both of said pair of parallel waveguides.

8. An optical modulator according to claim 1, wherein said optical modulator is provided with a silicon film formed on the side face of said substrate.

9. An optical modulator according to claim 8, wherein said silicon film is positioned between the side face of said substrate and said floating electrode.

10. An optical modulator according to claim 8, wherein said silicon film is positioned on said floating electrode.

11. An optical modulator constructed by making an optical modulator in claim 1 is made a unit configuration, to connect a plurality of said unit configurations in series.

* * * * *